Figure 8:
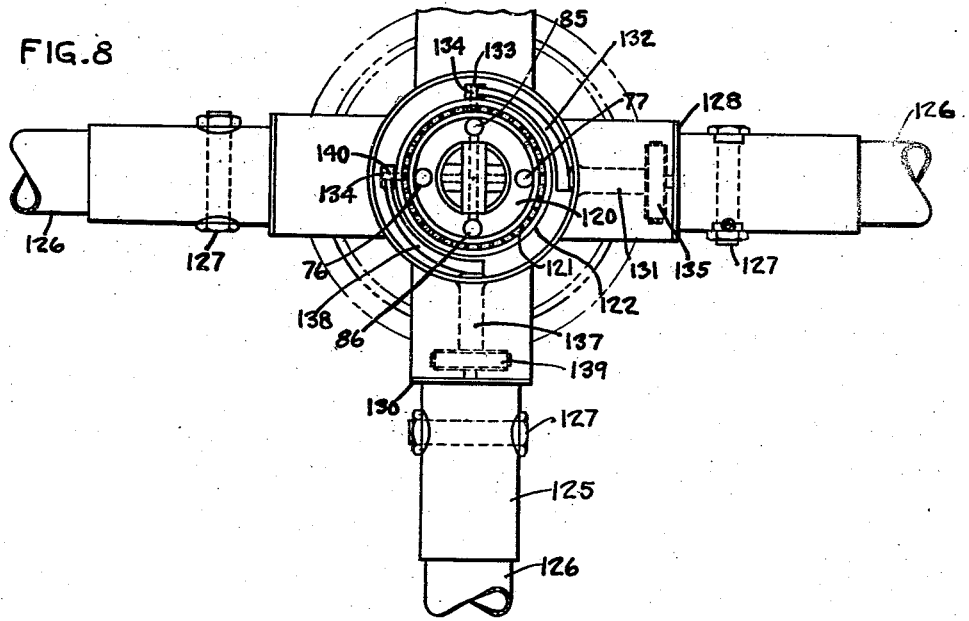

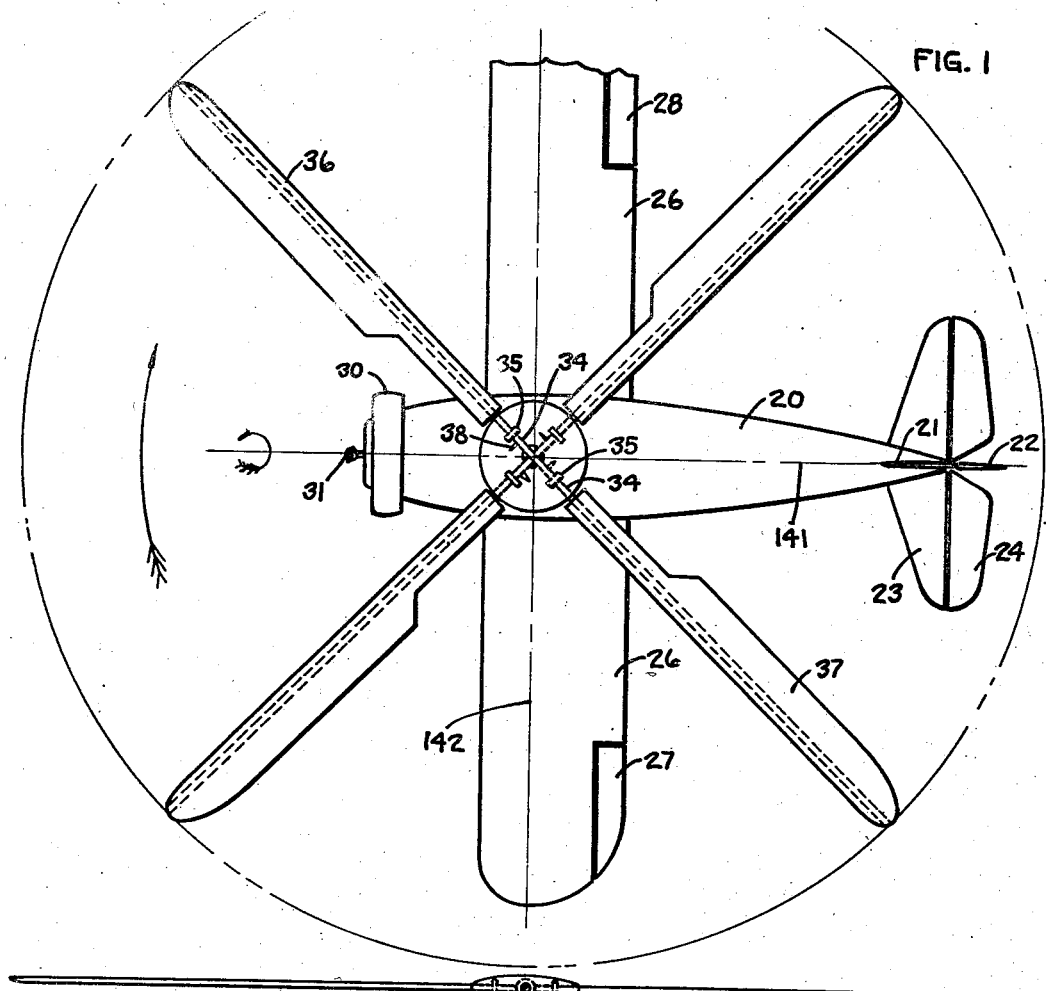

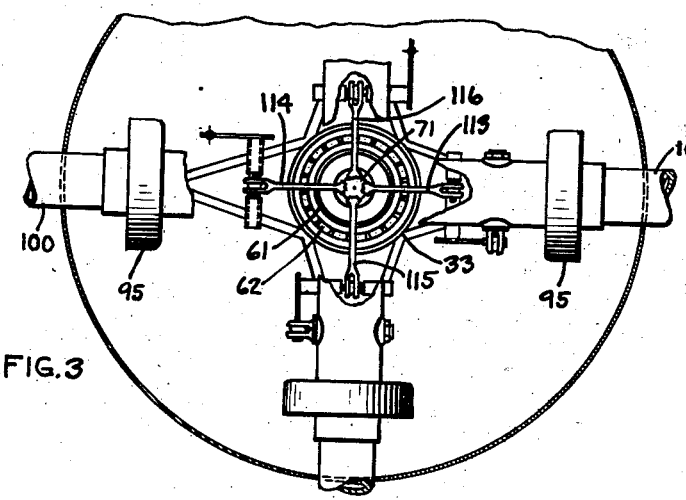
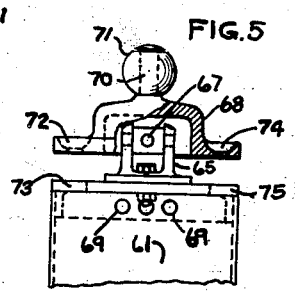
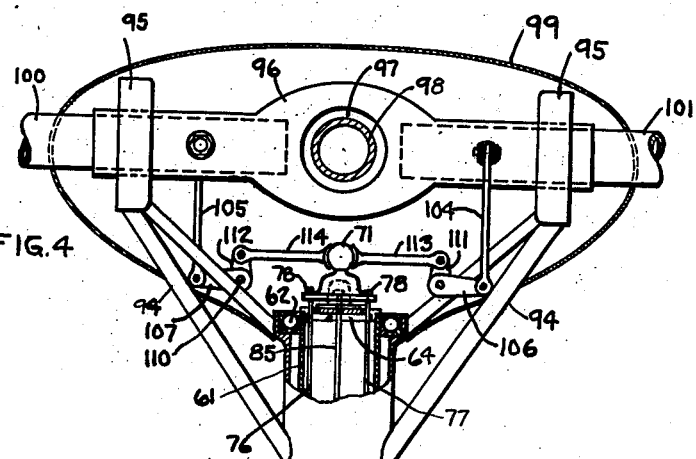
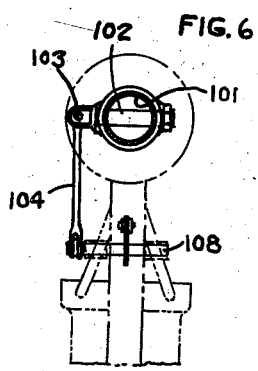
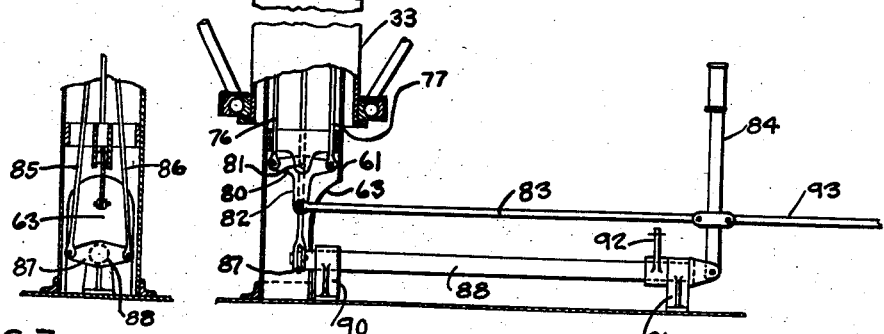

Feb. 1, 1938. E. B. WILFORD 2,106,783
GYROPLANE
Filed July 17, 1933 5 Sheets-Sheet 3

INVENTOR.
EDWARD B. WILFORD
BY Frank H. Borden
ATTORNEY.

Feb. 1, 1938.  E. B. WILFORD  2,106,783
GYROPLANE
Filed July 17, 1933  5 Sheets-Sheet 4

INVENTOR.
EDWARD B. WILFORD
BY Frank H. Borden
ATTORNEY.

Feb. 1, 1938.                E. B. WILFORD                2,106,783
                              GYROPLANE
                          Filed July 17, 1933            5 Sheets-Sheet 5
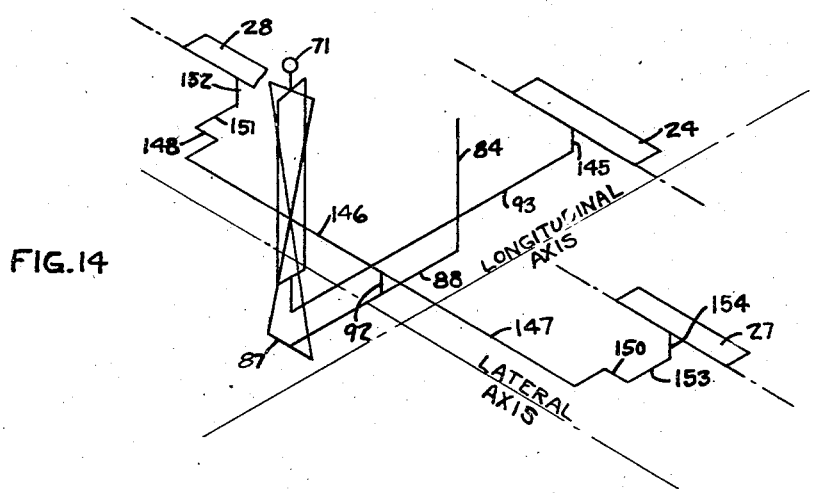
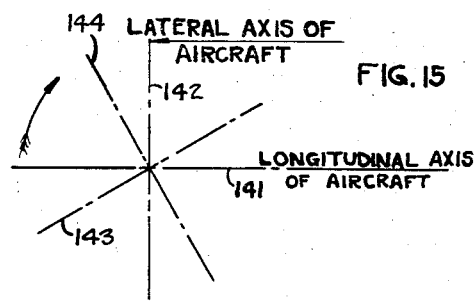
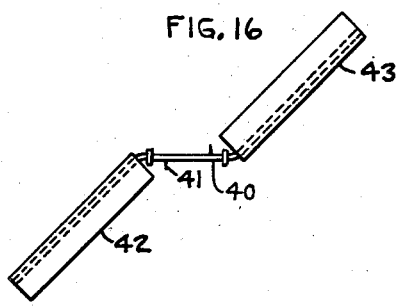
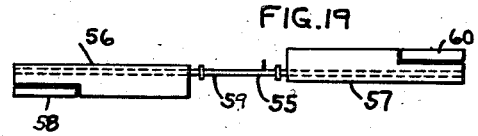
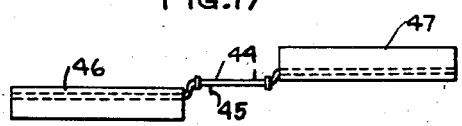
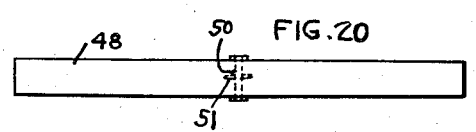
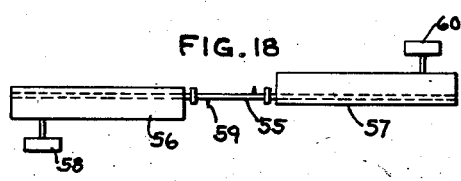
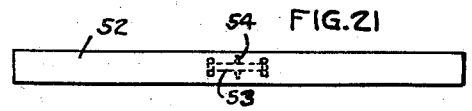
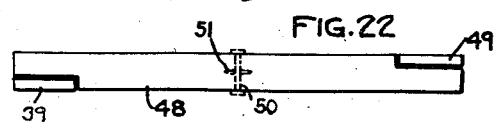
INVENTOR.
EDWARD B. WILFORD
BY
Frank H. Borden
ATTORNEY.

Patented Feb. 1, 1938

2,106,783

UNITED STATES PATENT OFFICE 2,106,783

GYROPLANE

Edward Burke Wilford, Merion, Pa.

Application July 17, 1933, Serial No. 680,695

3 Claims. (Cl. 244—8)

This invention relates to gyroplanes and particularly to aircraft having rotating wing systems which are normally aerodynamically driven, possessed of controllability for securing moments about the longitudinal and lateral axes of the aircraft, at the will of the pilot.

This invention constitutes, in part at least, an improvement upon Rieseler and Kreiser application Ser. No. 479,037, filed August 30, 1930. In that application there was disclosed a rotary system in which opposite blades were coupled on an oscillatable shaft, with springs arranged for damping and limiting the oscillations of the shaft and coupled blades and for variably setting the spring loadings, so as to secure desired control moments. Changing the compressible springs for substituted substantially inelastic links (or overloading the springs beyond the loads of torque) among other changes, secured unexpected and desirable improvements in operation of the control system.

It has been necessary with other types of rotary wing aircraft to provide a small wing as the sustaining element of ailerons or similar control surfaces by which control of the aircraft was secured, as no practical control was, prior to my invention, heretofore derivable from the rotor itself. The small wing was also used to assume small portions of the load so as to keep the rotative speed fairly constant under varying conditions. It is a fundamental advance in aircraft and an object of this invention to couple the controlling system of the rotary wing system with movable control surfaces and with the ordinary control mechanism, whether stick, wheel, or the like, so that synchronization of control between the rotor, and/or ailerons, and/or elevators is achieved.

In a co-pending application there is set forth a description of an aircraft in which a rotary wing system is combined in an aircraft with a fixed wing system, in such manner that the rotor can be "unloaded", with the load taken from the rotor and carried on the fixed wing, permitting the rotor to decelerate or stop, and therefore sharply reducing its drag, so that the efficiency is substantially that of any conventional fixed wing type of aircraft at cruising speeds. The rotor may remain stationary or turn slowly, being urged to rotation only by the prepondering drag of the blade having its trailing edge exposed to the relative airstream, over the blade which exposes its entering edge to the relative airstream. The "unloading" of the rotor and loading of the fixed wing, and the "loading" of the rotor, so that it carries the major load as the fixed wing is unloaded, among other reasons, because of the conjoint control described and claimed herein. The important element to be noted being that the change from loading to unloading is smooth and even, and with the control system described herein, the control action should be and is, smooth and even, with no unhooking from one system before engaging another. The use of one system, does not handicap the use of the other.

It is a further object of the invention to provide a rotor control system for rotary wing aircraft in which the control system is so disposed as to cause oscillation of the shaft carrying the blades in such predetermined angular degree and with such turning as substantially coincides with the normal aerodynamic oscillation of said shaft, by unbalance of opposing torques from such blades, and is attained without placing any great load on the manual control part.

Another object of the invention lies in predeterminedly disposing the control system with the rotating wing system in such manner that the gyroscopic moment in precession is compensated for to secure a desired angularly disposed aerodynamic moment.

Another object of the invention is to provide rotor control in various different sorts of rotary wing systems and to combine broadly any rotor control system with conventional standard controls with beneficial results.

A further object is to provide control in the rotary wing systems having various forms of articulated blades.

The invention contemplates many other objects and advantages which will become more apparent as the description proceeds.

Figure 9:
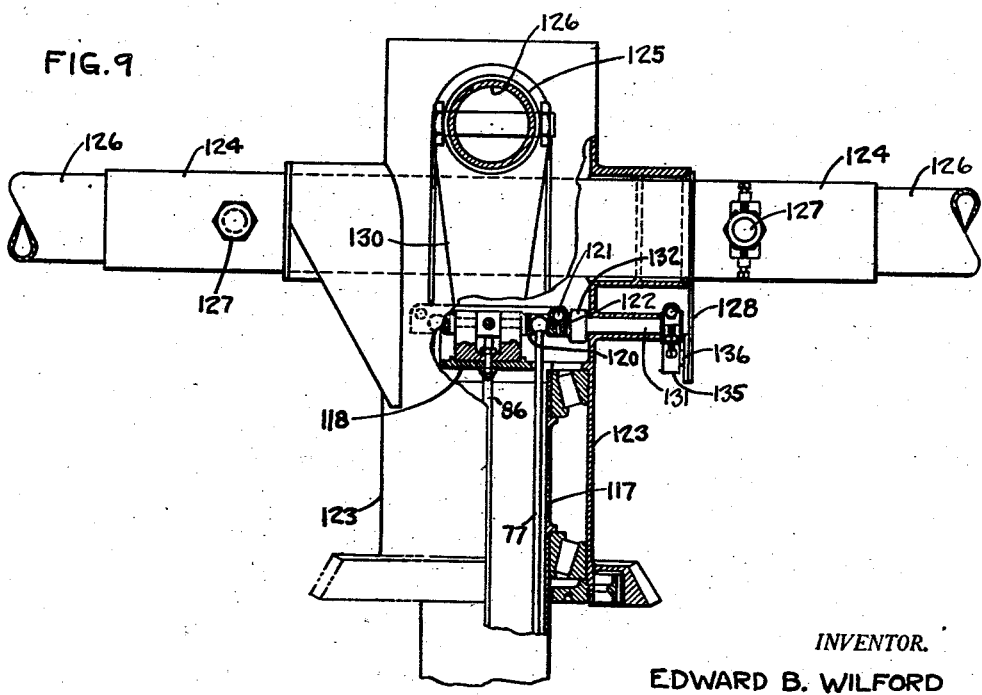
Figure 10:
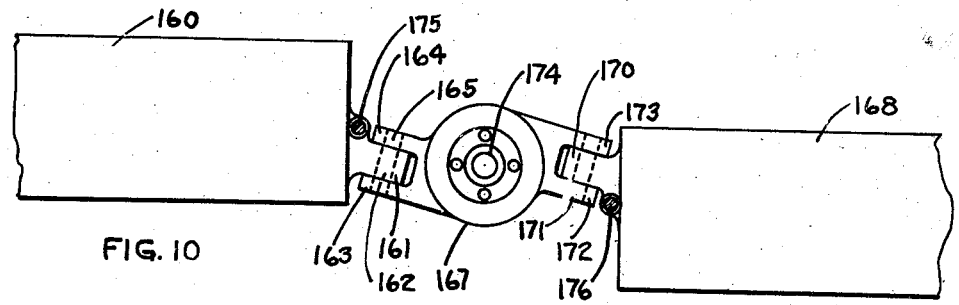
Figure 11:
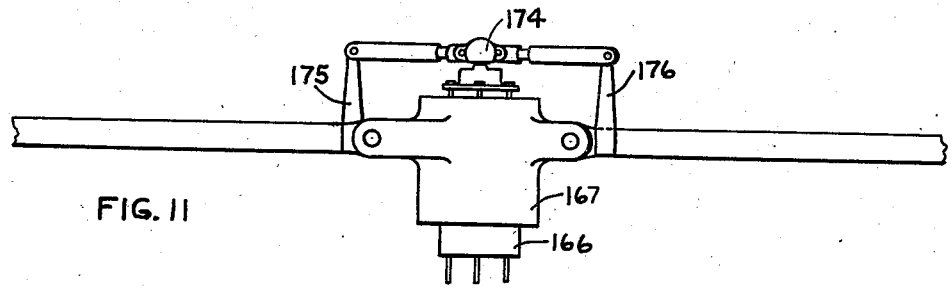
Figure 13:
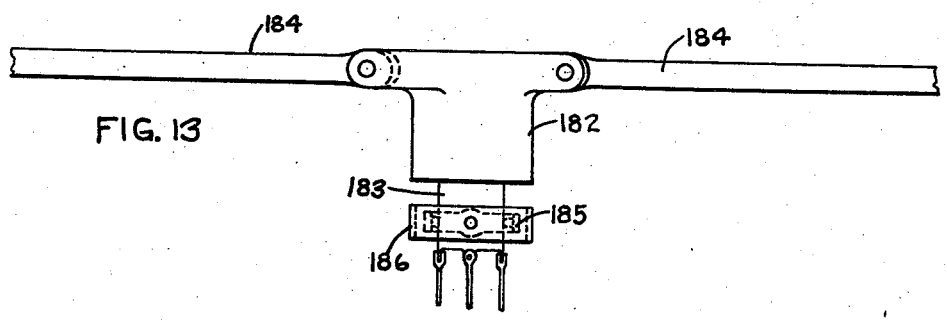
Figure 12:
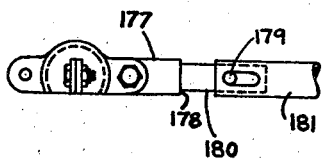

In the accompanying drawings:

Fig. 1 represents a fragmentary diagrammatic plan of an aircraft constructed in accordance with this invention, Fig. 2 represents a diagrammatic side elevation partially in section of the aircraft of Fig. 1, Fig 3 represents a fragmentary plan partially in section of an illustrative form of the invention, Fig. 4 represents a fragmentary diagrammatic elevation partially in section of the illustrative form of invention shown in Fig. 3, Fig. 5 represents a detail of the eccentrically movable control element of the preferred form of invention, Fig. 6 represents a fragmentary vertical section partially in elevation in dotted lines to show a detail of the control mechanism, Fig. 7 represents a fragmentary detail of the device of Fig. 4, Fig. 8 represents a fragmentary plan of a modified form of invention, Fig. 9 represents a fragmentary elevation of the same partially in section, Fig. 10 represents a fragmentary plan, partially in section of a further modified form of invention, Fig. 11 represents a fragmentary elevation partially in section, of the device of Fig. 10, Fig. 12 represents a fragmentary detail of the device of Fig. 10, Fig. 13 represents a fragmentary elevation of a still further modification, Fig. 14 represents a diagrammatic disclosure of the coupling and synchronization of the rotor control system, the ailerons and elevator of the aircraft, Fig. 15 represents a diagrammatic illustration of the setting of the rotor control device to compensate for errors otherwise attaching to the moment of precession of the rotor, Figs. 16 to 22 represent diagrammatic plans of modified multi-bladed rotors with which the instant invention may be operatively associated.

Referring to Figs. 1 and 2 there is provided an aircraft comprising a fuselage 20 having in the empenage a vertical fin 21 and rotor 22, horizontal stabilizing fin 23 and elevator 24 which for general purposes may be of ordinary and conventional construction. A tail skid or wheel 25 attaches to the fuselage 20. The fuselage is provided with a wing 26 extending laterally on each side thereof and provided with left side aileron 27 and right side aileron 28. A power plant 30 and propeller 31 of any desired construction are suitably mounted on the fuselage. A landing gear 32 is arranged to support the aircraft on the ground, by cooperating with the tail skid or wheel 25.

As an essential part of the aircraft assembly there is provided a rotatable mast 33 carrying a rotating wing system of any desired sort but preferably as disclosed herein in Figs. 1 and 2, or as shown in Figs. 8, 9, 10, 11, or 13, or as indicated diagrammatically in any of the several figures of the group shown in Figs. 16 to 22 inclusive. For purposes of illustration and description the rotary wing system is preferably of the four bladed type such as is disclosed, for instance, in Rieseler and Kreiser Reissue Patent No. 18,358. It is contemplated that the rotary wing system may comprise an uneven number of blades, such as 3, or 5, and the like, as more particularly described in a companion case about to be filed, as well as those of the even number of blades such as 2, or 4, or the like. For purposes of this specification one related pair of blades will be considered as typical. Thus in Fig. 1 a shaft 34 is journalled in bearings 35 suitably mounted upon the rotatable mast 33 and carries blades 36 and 37 which preferably are each so disposed that their center of pressure lies behind the axis of oscillation, which in Fig. 1 is the axis of shaft 34, in the direction of rotation of the blades shown by the arrow in Fig. 1. The shaft 34 carries at least one horn or lug 38 to which control mechanism, to be described, is attached for controlling the blade position.

In this connection it will be clear that the blades 36 and 37 of Fig. 1 in their relation to shaft 34 and to the bearings 35 may be superseded by the several modifications of two bladed rotors disclosed in the drawings and specifically by certain of the illustrated modifications as follows: In Fig. 16 the shaft 40 having operating lug 41 has the "swept back" blades 42 and 43 rigidly mounted on shaft 40 at any desired angle between 0° and 90° so that oscillation of shaft 40 involves a combination of feathering of blades 42 and 43, as well as a flapping of said blades so that the blades change their angle to the horizontal in response to the shaft oscillation. It will be clear that in the disclosure of Fig. 16 the center of pressure of each blade is behind the axis of shaft 40 so as to impose opposite torque on shaft 40 in a manner similar to the disclosure of Fig. 1. Fig. 17 provides a shaft 44 having operating horn 45 and the staggered blades 46 and 47 disposed so that their longitudinal axes are parallel to shaft 44 but are out of alignment therewith. In Fig. 20 there is disclosed a single tilting blade 48 pivoted on an axis 50 and controlled in its flap by means of its control arm or horn 51 so that flapping of the blade 48 about the axis 50 can be controlled. This axis 50 can be angularly askew if desired. Fig. 21 discloses a similar flapping blade 52 mounted upon an axis 53 longitudinal of the tilting blade and having a controlling horn 54. As typifying a further type of modification the disclosure of Fig. 19 may be used with the disclosure of Fig. 1, in that a shaft 55 rigidly carries blades 56 and 57 which are rigidly mounted against oscillation on the axis 55, and change their effective lift solely in response to the angular positioning of the respective ailerons 58 and 60. A control horn 59 is provided for swinging the ailerons. A further modification of the device of Fig. 19 is found in Fig. 18, in that blades 56' and 57' are journalled for rotation on shaft 55', in response to change of angle of ailerons 58' and 60' through actuation of control horn or lug 59'. Similarly the device of Fig. 20 may be further modified by providing the blade 48 on axis 50, either perpendicular to the longitudinal axis as shown, or angularly divergent therefrom, and having ailerons 39 and 49 controlled by the horn 51, as shown in Fig. 22.

It will be understood that with these several forms of blades and rotor assemblies there have been disclosed a specifically mentioned single control element for each blade coupling, which is all that is necessary with an inelastic link comprising the preferred form of invention herein. It will be clear that for purposes of balance, symmetry, and the like, complemental opposite control elements may be provided as disclosed in each of the several figures.

Referring to Figs. 3 and 4 the substantially vertical rotatable mast 33 is journalled for rotation relative to a fixed inner tube 61 through an upper ball race 62 and other bearings maintaining the rotatable disposition of the mast 33 relative to the fixed tube 61. The fixed tube 61 is cut out at the lower end as at 63 to permit the control elements, to be described, to enter, and at the upper end is closed by a suitably apertured plug 64. The plug 64 is locked to tube 61 by means permitting rotative adjustment, as by means of a suitable plug selectively engaging one of a series of apertures 69 in tube 61, with an opening in the flange of plug 64. This adjustment enables experimental or other adjustment to compensate aerodynamically for precessional moments of gyration. The plug has a pair of upstanding arms 65 which, as shown in Fig. 5 support a pivoted gudgeon block 67 upon which a cap or closure 68 is journalled and obviously arranged for universal movement through proper tilt of the gudgeon block 67 and of the cap 68. The upper part of the cap 68 carries a shaft 70 upon which a control ball 71 is rotatably mounted. Cap 68 and plug 64 have each four sets of registering openings as 72, 73, 74 and 75. These openings are diametrically disposed for attachment of control devices to be disclosed. One set of openings has links 76 and 77 extending through them and the latter have threaded nuts 78 at their upper ends to abut the top surface of the cap 68, and extend downwardly to pivotal connection with a bell crank lever 80 pivoted on a laterally extending axis 81, and movable by means of the depending arm 82, to which the horizontal link 83 is pivotally connected and which latter is in turn pivoted to the manual control element 84. The manual control in its simplest form comprises a conventional "stick" but any other form of control such as is common in the art may equally well be utilized in the connection. The fore and aft shiftable link 83 enters tube 61 through opening 63. Lateral control links 85 and 86 after crossing are respectively connected through the lateral registering openings with the cap 68 at the top, and are pivotally connected to the rock shaft lever 87 rigidly carried on rock shaft 88 journalled at 90 and 91 and connected to the stick 84 for lateral control movements. The rock shaft 88 may carry a horn or arm 92 to which control mechanism for ailerons and the like may be pivotally mounted as will be later described. It will be observed also that in the preferred form, as shown in Fig. 4, link 93 is pivotally connected to the control stick 84 for attachment to the elevator of the aircraft.

Rigidly mounted upon the rotatable mast 33 are the struts and bracing arms 94 carrying the bearings 95 in which the short sleeved shaft 96 is rotatably disposed. This shaft has an enlarged central opening 97 affording clearance from a similar short shaft 98 as may be necessary when the shafts carrying the blades all lie in the same plane. Axially slidable in the sleeve shaft 96 are the blades 100 and 101 of any of the pairs of blades shown in the preferred or modified forms. The blade shafts 100 and 101 and the sleeve 96 will each have transverse openings in registration to receive the laterally insertable bolt or stud 102, which anchors the blades securely to the shaft and also furnishes a stud or extension 103 laterally of the sleeve shaft 96 to which a link 104 is pivotally connected. Similar mechanism is provided for shaft 100 so that a link 105 connects thereto. The vertical links 104 and 105 connect respectively to arms 106 and 107 mounted in turn on transverse shafts 108 and 110, respectively, journalled upon the braces 94. Vertical arms 111 and 112 connect rock shafts 108 and 110 respectively with opposite links 113 and 114 abutting the ball 71. It will be clear that desired movements of the stick 84 will, through bell crank 80 transmit desired movements to the control ball 71 and will impart identical but opposite movements to the respective vertical links 104 and 105 to control the oscillations of the sleeve 96.

It is not considered essential to describe in detail the control mechanism responsive to the lateral control or movement of the ball 71 other than to mention lateral control links 115 and 116, coupled through similar mechanisms with sleeve shaft 98 as will be clear.

In the form of the invention disclosed in Figs. 8 and 9 the arrangement contemplates a plurality of blades, preferably four, arranged with their coupling shafts disposed in vertically spaced and in non-intersecting relation. In this form of the invention a fixed tubular element 117 supports an upper closure cap 118 of a construction quite similar to that of cap 64 in Figs. 3, 4 and 5, but the universally mounted element comprises the inner or relatively stationary member of a ball race 120. The latter carries ball bearings 121 and complemental rotatable race element 122. It will be understood that the same control mechanism as heretofore described will be available to adjust the angular disposition of the rotatable race member 122, including the vertical links 76, 77 and 85, 86.

A housing 123 is provided with suitable bearings and journals as to rotatably support a lower sleeve shaft 124 and an upper sleeve shaft 125, the axes of which are preferably substantially perpendicular but in parallel spaced horizontal planes. Each sleeve is preferably arranged to removably receive the stub shafts 126 of wings or blades (not shown). The blade shafts are anchored in the sleeves by means of removable bolts 127 or the like. The bolts 127 are preferably adjustable relative to the sleeve shafts 124 and 125 or relative to the stub shafts 126, so that the relation of wings or blades can be varied if desired. Rigidly attached to the sleeve shaft 124 is the depending arm 128. A similar, but longer arm 130 is mounted upon the sleeve 125. The depending arms 128 and 130 form part of the operating control system responsive during rotation to the angular positioning of the race element or member 122, through connections about to be described. A radially extending shaft 131 is suitably journalled in the housing 123 in parallel spaced relation to the sleeve shaft 124, and at its inner end rigidly carries the arcuate lever arm 132, pivoted at 133 to the rotatable race member 122, by means of a radial pin 134 substantially perpendicular to the axis of shaft 131. The outer end of the radial shaft 131 carries a short depending arm 135. Arms 135 and 128 are coupled by a suitable cross pin 136. As arms 135 and 128 swing on eccentric axes, suitable lost motion or other play is provided to enable them to swing simultaneously without binding. A radial shaft 137, similar but normal to shaft 131, is arranged to oscillate in the housing 123, and its inner end connects with an arcuate lever arm 138, similarly pivoted at 140 to the rotatable race member 122. While shafts 131 and 137 have axes which lie in the same substantially horizontal plane, the sleeve shafts to be controlled are different distances from this plane so that a longer depending arm 130 is provided on the upper sleeve shaft 125, and is coupled with suitable lost motion devices to a longer depending arm 139 carried outwardly of shaft 137, so that for the same vertical movement of the pivot points 140 and 133, (the control points for the arcuate lever arms) there is imparted the same oscillation to the respective sleeve shafts 124 and 125, despite their vertical spacing.

Referring to Figs. 10, 11 and 12, there is disclosed a type of rotor or rotary wing system in which independent articulated blades are brought into the synchronous control system of this invention. Thus a blade 160 has an oblique lug 161, which may be not only angularly divergent from the longitudinal axis of the blade 160, but also angularly divergent from a plane containing a lateral or transverse axis. It illustrates the feature of an oblique or "askew" articulation to have the pivot pin opening 162 in the lug 161 have its axis lying in the fore and aft plane of the blade, and thus to be angularly divergent or cocked in but one plane instead of two. The lug 161 is disposed between hub lugs or cheeks 163 and 164 to which it is hinged by a pivot pin 165. The cheeks 163 and 164 are substantially parallel to tangents of the vertical axis of mast 166 and of the rotatable hub 167. Blade or wing 168 is similarly provided with lug 170, connected by pivot pin 171 to the lugs 172 and 173.

It may be assumed that a universally oscillatable ball 174, controlled through the links already described, will have compound links connecting the control ball 174 with horns rigid with the respective blades, as 175 and 176. The compound links are comprised of part 177 carried hingedly with the ball 174 and having a shoulder 178 and a reduced extension 180 upon which a sleeve link 181 is slidable through the pin and slot connection 179. As the blades both flap and feather as they swing on their respective axes allowance has to be made for their rising under load and during flapping. The same coupled control is available to synchronize directed rolling and pitching moments with those from the conventional control surfaces.

In Fig. 13 there is disclosed another system arranged for coupling into the system. The rotatable hub 182, journalled on mast 183, has articulated blades 184. The gimbal suspension 185 supports the mast 183 relative to a fixed wing 186, and the angle of the mast 183 relative to the vertical can be varied and controlled by the links already described. The shifting axis of rotation is a method of securing desired rolling and pitching moments, as will be clear.

It will be clear that the structure of Figs. 8 and 9 represents a system for coordinating and synchronizing several blades so that a predetermined but obviously variable cycle of oscillations is secured. It will be noted further that the control system represents means for securing coordinated and synchronized control of a plurality of non-coincidental non-intersecting shafts, which is available for control of an odd number of blades and shafts as well as the even number disclosed. This latter application of the invention is being made the subject matter of a patent application now in preparation.

It will be understood that the relationship of the control ball 71, or of its equivalents including the rotatable race member 122, to the control stick 84 and its equivalents, will be a matter of rigging and choice as to whether a concentric position of ball 71 finds the stick 84 in concentric or eccentric relation to the vertical. It is of interest only to know that with the average normal use of the aircraft in forward flight, there will be an aerodynamic urge to oscillate the shafts periodically to feather or otherwise change the attitudes of the respective blades or wings so as to equalize the effective lifts on opposite sides of the substantially vertical axis of mast 33. This cycle of oscillations during rotation of the wing system will result in aerodynamically developed torque on the shafts developing lateral thrust on the ball 71 to move it to a position of eccentricity. The eccentricity varies according to the forward speed, and in vertical descent, with no forward speed, will be non-existent. Therefore it can not be predisposed in such manner as to suit all conditions, but only normal average conditions.

There is another factor of considerable interest in devices of this type affecting the control available from the system. This is the factor of gyroscopic action of the rotating system. The precessional moment developed in actuating the controls to secure a desired moment about any horizontal axis of the ship frequently is manifested by the resultant moment being about an axis angularly divergent from that contemplated. In other words "lead" must be given to turn the moment in precession to good account. Referring to Fig. 15, there is a diagrammatic disclosure of the longitudinal axis 141, and of the lateral axis 142. With the wing system rotating in the direction of the arrow, it will be clear that if the effective lift were to be placed on the fore and aft axis 141 directly, the resultant movement would be a disposition of the lift moment on an axis angularly spaced behind the fore and aft or longitudinal axis 141. If the effective lift were placed on an axis 143 angularly in advance of the longitudinal axis upon which the resultant is to be effective, in the direction of rotation, it will be clear that if the lead coincides with the precessional lead, the result will be the utilization of the heretofore deplored precessional moment to a satisfactory and efficient purpose and the securing of the exact controlling moment desired. It will be clear that a similar lead as by an axis 144 can be given for the lateral axis of the aircraft. To secure this happy result, my invention contemplates an angular change in the relationship of the control device 84, and the ball 71 or its equivalents. Specifically the apertured plug 64, (Fig. 5), or 118, (Fig. 9), is rotated about the vertical axis so that the links 76, 77, 85 and 86 are each angularly inclined relative to the vertical, in the forms of inventions shown herein. The result, however secured, is that a direct fore and aft movement of the control stick 84 does not have a direct fore and aft movement of the control member 71 or 122, but has a control member movement in a plane angularly divergent from the fore and aft. Thus, specifically, the control stick movement on the line of axis 141 of Fig. 15, results in a control member movement in the line of axis 143.

It will be recognized that through the system of links and levers disclosed, a given movement of the control stick 84 or its equivalent results in a positive oscillation of a control sleeve of the rotary wing system, and a given change in the attitude of the coupled blades. It is a feature of importance that the control system under consideration, as shown in Fig. 14, is coupled with the ailerons and empenage control surfaces in a synchronous system of efficient and rapid control. The link 93, pivoted at the rear of the control stick 84, and movable in a fore and aft line with the control device 84, may be pivotally connected to the depending horn 145 mounted on the elevator surface 24, and arranged to oscillate the elevator 24 in synchronism with the fore and aft adjustments of the control ball 71 or control race member 122. Similarly the horn 92 mounted for oscillation with the shaft 88 controlled by the member 84 has pivotally attached laterally extending links respectively 146 and 147, which latter are respectively connected with bell crank levers 148 and 150. Bell crank lever 148 has a link 151 engaging horn 152 mounted on aileron 28. Bell crank lever 150 has a link 153 engaging a horn 154 mounted on aileron 27. It will be clear that the degree of movement accorded to the respective control surfaces 24, 27 and 28 can be predeterminedly proportioned relative to the degree of movement of the oscillatable control devices in the rotor control system, so that any desired controlling action can be secured. The lengths of the respective horns determine the order of magnitude of controlling actions. It will be understood that in the usual situation it will be necessary to have but small controlling actions in the rotary wing system, as a few degrees of movement therein secures appreciable changes in turning moments, while the action of ailerons and elevators may be of greater or smaller magnitude as desired. It will further be clear that the aileron control and the elevator control may be separately coupled with the rotary wing system, in place of the joint coupling in the illustrative disclosure of this application.

In the preferred embodiment of the invention, the central hub and the working elements, controls, etc., are all faired in by a substantially stream-lined housing 99.

I claim as my invention:

1. In aircraft, a normally aerodynamically driven rotary wing system comprising a hub, a shaft having an axis and journalled diametrically on said hub, a blade having a longitudinal axis mounted on said shaft with its longitudinal axis substantially parallel with said shaft but rearwardly offset therefrom, and control means for moving said blade on and relative to the axis of the diametrically disposed shaft.

2. In aircraft, a normally aerodynamically driven rotary wing system comprising a hub, a shaft journalled in the hub, blades on said shaft on opposite ends thereof, a second shaft journalled on the hub intersecting a substantially vertical plane containing the axis of the first shaft but with its axis lying in a substantially horizontal plane in substantially parallel spaced relation to a substantially horizontal plane containing said first mentioned axis, blades on the second mentioned shaft at the ends thereof, control means operative on each shaft to change the angle of incidence of each pair of blades in synchronism during rotation of the hub.

3. In aircraft, a normally aerodynamically driven rotary wing system comprising a hub, a shaft journalled in the hub, blades on said shaft on opposite ends thereof, a second shaft journalled on the hub intersecting a substantially vertical plane containing the axis of the first shaft but with its axis lying in a substantially horizontal plane in substantially parallel spaced relation to a substantially horizontal plane containing said first mentioned axis, blades on the second mentioned shaft at the ends thereof, control means operative on each shaft to change the angle of incidence of each pair of blades in synchronism during rotation of the hub, said control means comprising a universally movable member within the hub, arms engaging the member to have their engaged ends move during rotation, and means engaging the respective arms and engaging the respective shafts to secure oscillation of the respective shafts.

EDWARD BURKE WILFORD.